United States Patent [19]

Lee

[11] Patent Number: 5,182,015
[45] Date of Patent: Jan. 26, 1993

[54] PLASTIC OIL FILTER ASSEMBLY
[75] Inventor: Albert Lee, Timonium, Md.
[73] Assignee: Alberee Ltd., Inc., Baltimore, Md.
[21] Appl. No.: 724,799
[22] Filed: Jul. 2, 1991
[51] Int. Cl.$^5$ .............................................. B01D 27/08
[52] U.S. Cl. ...................................... 210/94; 210/136;
210/232; 210/440; 210/444; 210/450; 210/455;
210/DIG. 17
[58] Field of Search ................. 210/94, 130, 136, 440,
210/444, 450, 451, 455, DIG. 17, 232, 452, 477,
493.1, 493.2, 493.5

[56] References Cited

U.S. PATENT DOCUMENTS

| | | | |
|---|---|---|---|
| 2,888,141 | 5/1959 | Coates et al. | 210/DIG. 17 |
| 3,985,657 | 10/1976 | Coughlan | 210/DIG. 17 |
| 4,144,169 | 3/1979 | Grueschow | 210/168 |
| 4,297,212 | 10/1981 | Padgett, Sr. | 210/168 |
| 4,622,136 | 11/1986 | Karcey | 210/168 |
| 4,629,558 | 12/1986 | Garritty | 210/130 |
| 4,672,932 | 6/1987 | Schmidt | 123/196 A |
| 4,834,885 | 5/1989 | Misgen et al. | 210/440 |
| 4,869,820 | 9/1989 | Yee | 210/316 |
| 4,992,166 | 2/1991 | Lowsky et al. | 210/130 |

FOREIGN PATENT DOCUMENTS

WO87/01957 4/1987 PCT Int'l Appl. ................. 210/455

Primary Examiner—Robert A. Dawson
Assistant Examiner—Matthew O. Savage
Attorney, Agent, or Firm—Birch, Stewart, Kolasch & Birch

[57] ABSTRACT

A plastic oil filter assembly comprises a closure plate having a plurality of radial supporting fins disposed on the inside surface thereof, a filter member having a saw-toothed coupling for tightly engaging with the plurality of radial supporting fins of the closure plate through a multiple-slit rubber valve, and a transparent exterior enclosure. The plastic oil filter assembly is simple in construction, inexpensive to manufacture, durable in use, and permits easy checking of the contamination level in filters of the filter member. The plastic oil filter assembly can reduce waste by permitting recycling of the used plastic filter assembly as a raw material.

8 Claims, 2 Drawing Sheets

PLASTIC OIL FILTER ASSEMBLY

BACKGROUND OF THE INVENTION

1. Field of the Invention

The present invention relates to a plastic oil filter assembly and more particularly, to a replaceable type plastic oil filter for use in the lubricating system of an internal combustion engine.

2. Description of the Prior Art

Various types of oil filters for use in the lubrication systems of internal combustion engines are well known in the art. Such prior oil filters are made of metal and therefore possess disadvantages such as, for example, being very heavy in weight and creating a waste disposal problem after use. Furthermore, the user of the prior art filter cannot check the contamination level thereof. Such prior oil filters are shown in U.S. Pat. No. 4,144,169 to Grueschow, U.S. Pat. No. 4,297,212, to Padgett, Sr. U.S. Pat. No. 4,622,136 to Karcey, U.S. Pat. No. 4,629,558 to Garritty, U.S. Pat. No. 4,672,932 to Schmidt, U.S. Pat. No. 4,834,885 to Misgen et al, and U.S. Pat. No. 4,869,820 to Yee.

SUMMARY OF THE INVENTION

Accordingly, it is an object of the present invention to provide a plastic oil filter assembly which eliminates the above problems encountered with conventional oil filters.

Another object of the invention is to provide an improved plastic oil filter assembly which is provided with an annular closure plate having a plurality of radial supporting fins disposed on the inside surface thereof, a rubber valve having a plurality of slits, and a filter member having a plurality of saw-toothed openings for tightly engaging with the plurality of radial supporting fins, respectively, so as to prevent oil from leaking therefrom, and a transparent exterior housing which allows for easy checking of the contamination level of filters in the filter member. Furthermore, the plastic oil filter assembly can be recyclable.

A further object of the present invention is to provide a plastic filter assembly which is simple in construction, inexpensive to manufacture, durable in use, and light in weight.

Other objects and a further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a plastic oil filter assembly which comprises an annular closure plate having a plurality of radial supporting fins disposed on the inside surface thereof, a filter member having a saw-toothed opening for tightly engaging with the plurality of radial supporting fins through a multiple-slit rubber valve, and a transparent exterior enclosure. The plastic oil filter assembly is simple in construction, inexpensive to manufacture, durable in use, and permits easy checking of the contamination level in filters of the filter member. Furthermore, the plastic oil filter of the present invention can reduce waste product pollution by permitting recycling of the used plastic filter assembly as a raw material.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
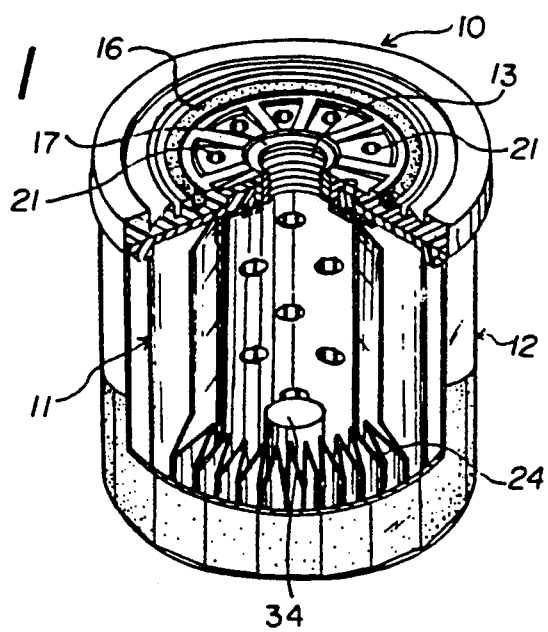
FIG. 1 is a perspective view of the plastic oil filter assembly of the present invention containing cut-away portions in order to illustrate the construction thereof.
Figure 2:
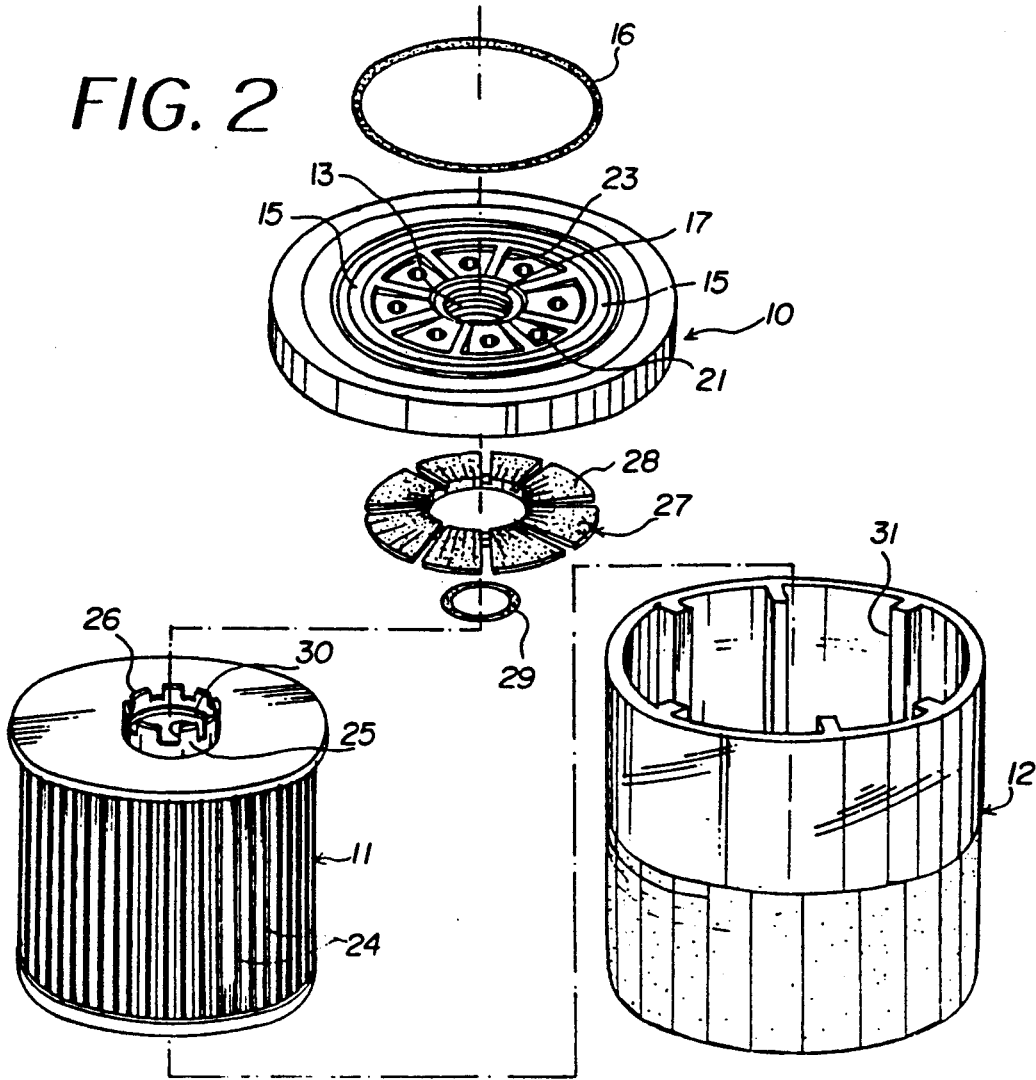
FIG. 2 is an exploded perspective view of the plastic oil filter assembly of the present invention.

Referring now in detail to the drawings for the purpose of illustrating preferred embodiments of the present invention, the plastic oil filter assembly as shown in FIGS. 1 and 2 comprises an annular closure plate 10, an oil filter member 11, and a transparent exterior housing or enclosure 12 secured to the annular closure plate 10 and housing the oil filter member 11. Closure plate 10 has an inside surface which faces the oil filter member and an outside surface which faces the engine block to which the assembly is attached.

Figure 3:
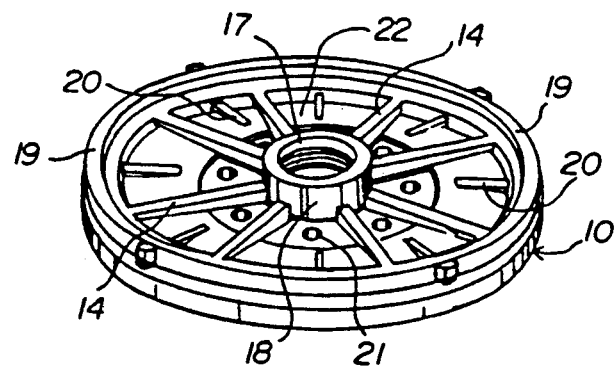
FIG. 3 is a perspective view of an annular closure plate of the plastic oil filter assembly of the present invention.

As shown in FIGS. 1, 2 and 3, closure plate 10 includes a center opening 17 serving as an oil outlet port to and from the filter member 11, a plurality of raised supporting fins 14 radially disposed on the inside surface of closure plate 10 for maintaining the stiffness of closure plate 10 and helping to spread fluid flow, and a groove 15 disposed on the outside surface of closure plate 10 for smoothly receiving a rubber ring 16 which contacts a raised boss of the engine block (not shown). On the inside surface of closure plate 10, the center opening 17 has a cylindrical flange 18 extending therefrom which surrounds a threaded metallic cylinder 13 attached thereto or a threaded plastic cylinder 13. A plurality of short raised supporting fins 20 extend from an annular edge 19 of the inside of closure plate 10 for maintaining the stiffness of closure plate 10 so as to resist bending due to the pressure of the engine block. A plurality of bottom supporting fins 23 are radially disposed on the outside surface of closure plate 10, and a plurality of small inlet ports 21 provide flow communication into spaces 22, which spaces 22 being formed on the inside surface of closure plate 10 between raised supporting fins 14 (FIG. 3).

Figure 4:
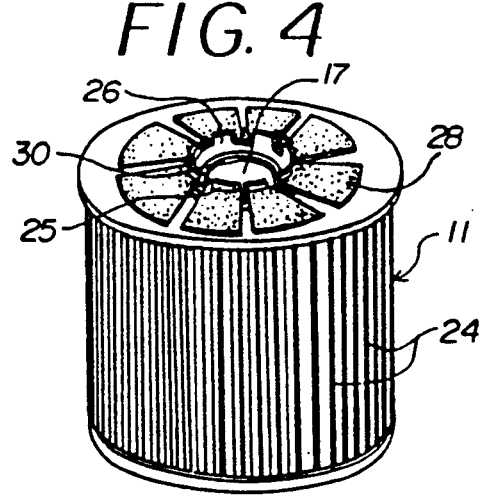
FIG. 4 is a perspective view of a filter member having a sawtoothed opening with a multiple-slit rubber valve of the plastic oil filter assembly of the present invention.

As shown in FIGS. 2 and 4, the oil filter member 11 includes a plurality of pleats 24. Oil filter member 11 engages closure plate 10 via a saw-toothed coupling 25 having a plurality of teeth 26 for alternately engaging with spaces between the plurality of raised supporting fins 14 on the inside surface of closure plate 10 through a radially slit rubber valve 27. The radially slit rubber valve 27 contains a plurality of valve blades 28 which are bent toward the plurality of small inlet ports 21. The pressure of oil entering inlet ports 21 during engine operation is sufficient to deflect valve blades 28, such that oil enters the oil filter assembly through inlet ports 21, flows around the perimeter of closure plate 10, is filtered through oil filter member 11 into the hollow interior of oil filter member 11, and exits the oil filter assembly through center opening 17. However, when the engine is not operating, valve blades 28 are not deflected by the pressure of incoming oil. Therefore, valve blades 28 serve to close off inlet ports 21 and prevent oil inside the filter from emptying out through center opening 17. In addition, if oil filter member 11 becomes clogged such that oil cannot pass through, the pressure of incoming oil builds up inside the oil filter assembly such that bypass valve 34 is opened. Thereafter, oil entering the oil filter assembly through inlet ports 21 flows around the perimeter of closure plate 10 and through bypass valve 34 directly into the hollow interior of oil filter member 11 without being filtered, and the unfiltered oil exits the oil filter assembly through center opening 17. A rubber ring 29 can be tightly inserted between the top of the cylindrical flange 18 on closure plate 10, and a circular raised portion 30 on oil filter member 11 extending from the interior of the saw-toothed opening 25.

The transparent enclosure 12 includes a plurality of inner supports 31 vertically extending from the interior thereof. Supports 31 hold the oil filter member 11 in place, thereby taking advantage of the resilient property of the plastic material of the transparent enclosure. Therefore, in the present invention, there is no need for a spring to support the filter unit as required in conventional metallic oil filters.

Figure 5:
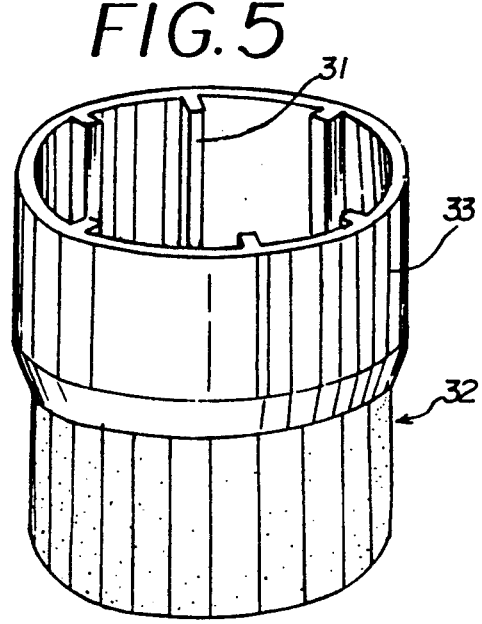
FIG. 5 is a perspective view of another embodiment of the transparent enclosure having a plurality of raised supports extending from the interior thereof.

Referring in detail to FIG. 5, there is illustrated another embodiment of a transparent enclosure construction in accordance with the present invention. The transparent enclosure 32 includes the same plurality of inner raised supports 31 as in transparent enclosure 12 shown in FIG. 2. However, transparent enclosure 12 has a constant diameter, while transparent enclosure 32 has two distinct sections having different diameters. The section 33 closer to closure plate 10 has an expanded diameter, thereby expanding the volume in which oil flow operates through the oil filter member 11.

Accordingly, the present invention provides a plastic oil filter assembly which is simple in construction, inexpensive to manufacture, durable in use, and light in weight. Furthermore, the plastic oil filter assembly can be effectively cleaned after use and can be recycled as a raw material.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A plastic oil filter assembly for use in the lubricating systems of an internal combustion engine, comprising:
   a closure plate having an inside surface and an outside surface, said closure plate including a center opening, a plurality of raised supporting fins radially extending from said center opening on said inside surface, a groove on said outside surface, a ring positioned in said groove, and a plurality of oil inlet apertures penetrating through said closure plate;
   an oil filter member having a filter and including a cylindrical saw-toothed coupling having a plurality of teeth extending axially from an edge thereof, wherein a respective said saw-tooth engages with a respective space defined between adjacent ones of said plurality of raised supporting fins in the closure plate, said saw-toothed coupling surrounding said center opening of the closure plate and having a cylindrical interior passage extending axially therethrough to provide communication between an interior of said filter and said center opening;
   a flat radially slit check valve surrounding said saw tooth coupling and positioned between said closure plate and said oil filter member to cover said inlet apertures; and,
   a transparent exterior enclosure secured to said closure plate and enclosing said oil filter member, said transparent exterior enclosure including a plurality of vertically extending raised portions disposed on an interior thereof for supporting said oil filter member.

2. The plastic oil filter assembly of claim 1, wherein said closure plate further comprises a plurality of short raised supporting fins located on said inside surface, said fins extending radially inward from an annular edge of said inside surface.

3. The plastic oil filter assembly of claim 1, wherein said center opening is surrounded by a threaded metallic cylinder.

4. The plastic oil filter assembly of claim 1, wherein said center opening is surrounded by a threaded plastic cylinder.

5. The plastic oil filter assembly of claim 1, wherein said center opening is provided with a rubber ring packing disposed between a circumferential flange extending from said inner surface of the closure plate and a circular shoulder extending from said interior passage of said saw-toothed coupling of the oil filter member.

6. The plastic oil filter assembly of claim 1, wherein said radially slit valve is made of rubber.

7. The plastic oil filter assembly of claim 1, wherein said ring positioned in said groove of the closure plate is made of rubber.

8. The plastic oil filter assembly of claim 1, wherein said transparent enclosure comprises a large diameter section located adjacent to said closure plate and a smaller diameter section located adjacent to said large diameter section, whereby said large diameter section provides an expanded space for oil flow to operate.

* * * * *